United States Patent
Wu (10) Patent No.: US 7,433,385 B1
(45) Date of Patent: Oct. 7, 2008

(54) CODE DIVISION MULTIPLE ACCESS COMMUNICATION

(75) Inventor: Yanyan Wu, Sandhurst (GB)

(73) Assignee: Nokia Corporation, Espoo (FI)

( * ) Notice: Subject to any disclaimer, the term of this patent is extended or adjusted under 35 U.S.C. 154(b) by 1244 days.

(21) Appl. No.: 10/088,637

(22) PCT Filed: Sep. 20, 2000

(86) PCT No.: PCT/GB00/03600

§ 371 (c)(1),
(2), (4) Date: Jul. 17, 2002

(87) PCT Pub. No.: WO01/22607

PCT Pub. Date: Mar. 29, 2001

(30) Foreign Application Priority Data

Sep. 20, 1999 (GB) .................................. 99222390

(51) Int. Cl.
*H04B 1/707* (2006.01)
(52) U.S. Cl. .................................................... 375/146

(58) Field of Classification Search ................. 375/140, 375/141, 144–149, 142, 143; 370/320, 335, 370/342, 441
See application file for complete search history.

(56) References Cited

U.S. PATENT DOCUMENTS

| 5,327,455 A | * | 7/1994 | De Gaudenzi et al. | ...... 370/207 |
| 5,822,363 A | * | 10/1998 | Le Roy | ........................ 375/143 |
| 6,181,674 B1 | * | 1/2001 | Xin et al. | ..................... 370/203 |
| 6,553,018 B1 | * | 4/2003 | Ichihara | ...................... 370/342 |
| 2002/0097779 A1 | * | 7/2002 | Bang et al. | ................... 375/144 |

* cited by examiner

*Primary Examiner*—Don N Vo
(74) *Attorney, Agent, or Firm*—Squire Sanders & Dempsey L.L.P.

(57) ABSTRACT

In a CDMA communication system, stations operating in the same area transmit to a receiver using a common carrier frequency. Each station transmits a plurality of bits in parallel using orthogonal spreading signals. These spreading signals are used by the stations in time-offset manner so that the transmissions from the stations are mutually orthogonal. The spreading signals may be generated by phase modulating a common spreading sequence so that the spectra of the spreading signals rotate at different rates.

56 Claims, 9 Drawing Sheets

CODE DIVISION MULTIPLE ACCESS COMMUNICATION

BACKGROUND OF THE INVENTION

1. Field of the Invention

The present invention relates to code division multiple access communication.

2. Description of the Prior Art

Code time division multiple access (CTDMA) has been proposed for cellular communications systems, for example mobile phone networks. In CTDMA systems, users in the same cell are allocated the same spreading code and respective time offsets. Although the users are using the same spreading code, orthogonality is presented because each user's use of the spreading sequence is time-shifted relative to the other users' use of it.

Under ideal conditions, many stations can use the same carrier frequency and spreading sequence because a one-chip offset between stations is sufficient to provide orthogonality. However, in real situations, signals often follow multiple paths of differing lengths between the transmitter and receiver. This causes interference when the path delay spread is greater than the spreading sequence offsets between users because the spreading sequence of the delayed signal from one station can become aligned with that of another at a receiver.

SUMMARY OF THE INVENTION

The present invention makes use of the fact that mutually orthogonal spread spectrum signals from a common source suffer virtually no degradation of orthogonality unlike signals from different sources which are prone to interference due to different multipath effects and amplitude variations. Consequently, differently spread signals from the same source can generally be more reliably discriminated than signals from different sources. In other words, the interference between signals transmitted from the same source on the same carrier is independent of multipath and fading effects. An additional gain is achievable because the interactions between the signals can be reliably predicted and the detection process modified accordingly.

According to the present invention, there is provided a method of transmitting a signal, the method comprising:
  providing digital data to be transmitted to a remote station as a plurality of parallel bitstreams;
  phase modulating the bitstreams with respective orthogonal or substantially orthogonal spectrum spreading signals to produce a plurality of modulating signals;
  phase modulating respective instances of a carrier with the modulating signals to produce a plurality to modulated carrier instances; and
  summing the modulated carrier instances and transmitting the result of the summation.

Each spreading signal may be produced by phase modulating a common finite spreading sequence with a respective cyclic signal, the cyclic signals being such that each completes an integer number of cycles in the duration of the spreading sequence. The effect of this is that the spectrum of each spreading signal rotates at a different rate. Not all of the spreading signals need to have rotating spectra and one of the spreading signals may simply comprise the common spreading sequence.

Preferably, the period of the spreading sequence is the same as the symbol period and the symbols are aligned with the spreading sequence. In other words each transmitted bit is spread by the whole spreading sequence.

The present invention may be used to send two or more signals in parallel. For instance a video signal could be send four bits at a time using four spreading signals and an accompanying audio signal could be sent with another spreading signal. Preferably, however, the bitstreams comprise bits of a single digital signal such that groups of bits of the single digital signal are transmitted in parallel.

According to the present invention, there is provided a transmitter comprising:
  a source of digital data to be transmitted to a remote station as a plurality of parallel bitstreams;
  first means, for instance a digital signal processor, for phase modulating the bitstreams with respective orthogonal br substantially orthogonal spectrum spreading signals to produce a plurality of modulating signals;
  second means, for instance analog phase modulators, for phase modulating respective instances of a carrier with the modulating signals to produce a plurality to modulated carrier instances; and
  a summer for summing the modulated carrier instances.

Preferably, the first means comprises means for producing each spreading signal by phase modulating a common finite spreading sequence with a respective cyclic signal, the cyclic signals being such that each completes an integer number of cycles in the duration of the spreading sequence. However, it is more preferred that the first means comprises means for producing one of the spreading signals by generating a finite spreading sequence and producing the other spreading signals by phase modulating the finite spreading sequence with a respective cyclic signal, the cyclic signals being such that each completes an integer number of cycles in the duration of the spreading sequence.

The cyclic signals are preferably substantially sinusoidal and are more preferably stepped sine waves, each step having the same duration as chips of the spreading sequence.

Preferably the spreading sequence c[.] is derived from a first code a[.] and a second code b[.] according to $$c[n]=[a[0]\overline{b}, a[1]\overline{b}, \ldots, a[M-1]\overline{b}].$$

which enables a relatively simple receiver design which will become apparent from the description of the exemplary embodiment.

Preferably, the Fourier transforms of the first and second codes satisfy:

$$s[t] \leftrightarrow S(e^{j\omega}) \neq 0 \text{ for all } \omega$$

where s and S represent the first and second codes in the time and frequency domains respectively.

Preferably, the source of digital data signals includes means, for instance a digital signal processor, for generating the bitstreams from a single digital signal such that groups of bits of the single digital signal are transmitted in parallel.

A transmitter according to the present invention may be employed in a mobile phone or a base station of a mobile phone network.

According to the present invention, there is provided a method of receiving a signal produced by a method according to the present invention, the method comprising the steps of:—
  producing a baseband signal, comprising components corresponding to the modulating signals, from a received rf signal; and
  processing the baseband signal by processes which extract the data from each of the modulating signals.

Preferably, at least all but one of the processes comprises:—
  phase modulating the baseband signal by the inverse of a respective one of the cyclic signal to produce a first signal;
  phase modulating instances of the first signal by respective cyclic signals of the form $e^{j2\pi nP/L}$ where P comprises the set of values in the range $0, \ldots, L-1$, and L is the length of the second code to produce L second signals;
  filtering each of the second signals with a filter having a transfer function which is the inverse of the first code to produce respective third signals;
  correlating the third signals with corresponding reference signals and summing the results of the said correlations.

In this context, "inverse" does not refer to the logically-inverted binary sequence by the reciprocal of the function (time or frequency domain) defining the code.

A method according to the present invention includes mapping the outputs of the processes onto a transmitted parallel bit pattern using a maximum likelihood algorithm and outputting the parallel bit pattern. In this way, account may be taken of interference between the parallel bitstream signals.

The data bits extracted by the processes may combined into a single data signal or kept as separate signals.

According to the present invention, there is provided a receiver for receiving a signal produced by a method according to the present invention, the receiver comprising: rf processing means for producing a baseband signal, comprising components corresponding to the modulating signals, from a received rf signal; and
  processing means, for example a digital signal processor, for processing the baseband signal by processes which to extract the data from each of the modulating signals.

Preferably, at least all but one of the processes comprises:—
  phase modulating the baseband signal by the inverse of a respective one of the cyclic signal to produce a first signal;
  phase modulating instances of the first signal by respective cyclic signals of the form $e^{j2\pi nP/L}$ where P comprises the set of values in the range $0, \ldots, L-1$, and L is the length of the second code to produce L second signals;
  filtering each of the second signals with a filter having a transfer function which is the inverse of the first code to produce respective third signals;
  correlating the third signals with corresponding reference signals and summing the results of the correlations.

Preferably, the processing means is configured for mapping the outputs of the processes onto a transmitted parallel bit pattern using a maximum likelihood algorithm and outputting the parallel bit pattern.

Preferably, the processing means is configured to combine the extracted data bits into a single data signal.

A receiver according to the present invention may be employed in a mobile phone a base station of a mobile phone network.

According to the present invention, there is provided a mobile phone network including a base station, having a receiver according to the present invention, in communicative relation to a plurality of mobile phones having transmitters according to the present invention, wherein the mobile phones employ the same carrier frequency and spreading signals for communication with the base station, each mobile phone applying the spreading signals in a time offset manner relative to the use of the spreading signals by each of the other mobile phones. The present invention is particularly advantageous for mobile-to-base station transmission and alternative schemes may be employed for base-to-mobile station transmission.

The present invention is not limited in its application to cellular mobile phone networks and is applicable in any situation when a plurality of transmitters must operate in the same area.

DETAILED DESCRIPTION OF THE PREFERRED EMBODIMENTS

An embodiment of the present invention will now be described, by way of example, with reference to the accompanying drawings.

Figure 1:
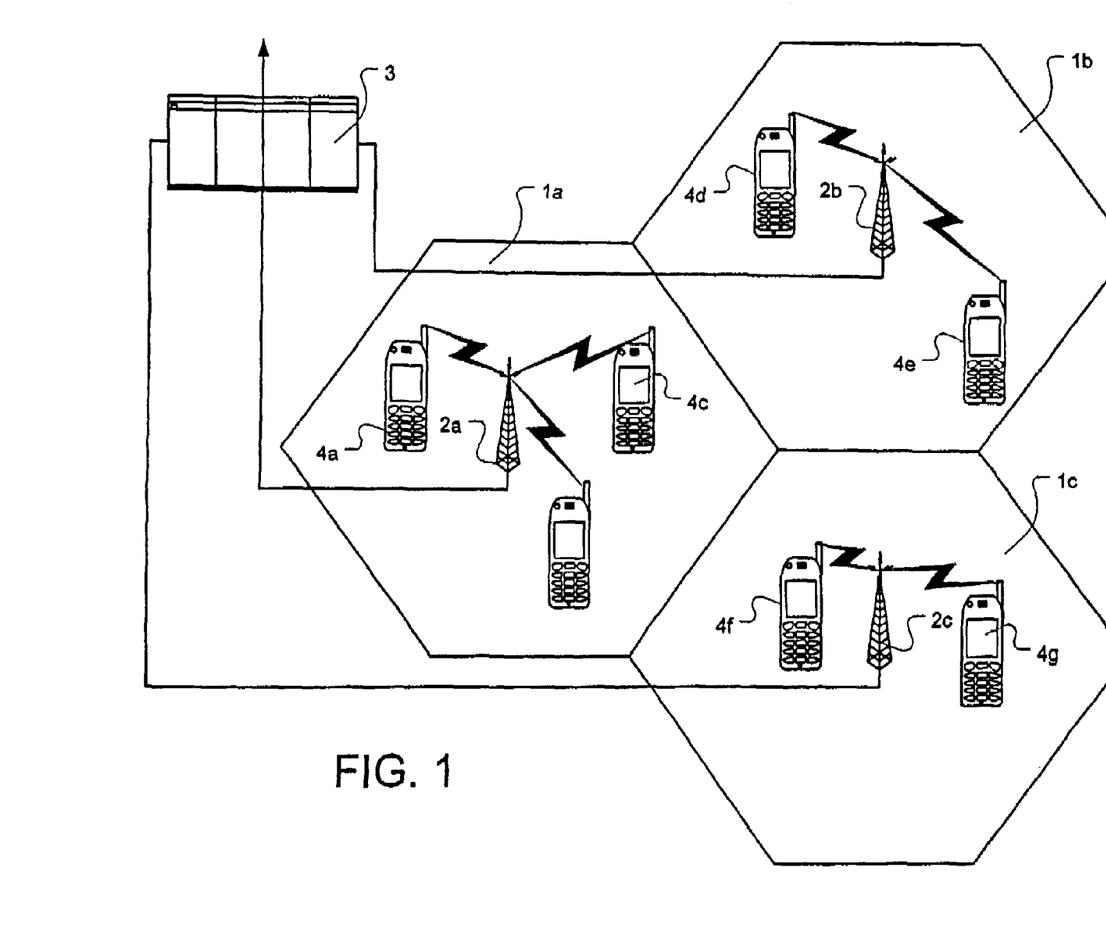
FIG. 1 illustrates part of a cellular mobile telephone network.

Referring to FIG. 1, a cellular mobile telephone network comprises a plurality of cells 1a, 1b, 1c defined by the radiation patterns of respective base transceiver stations 2a, 2b, 2c. The base transceiver stations 2a, 2b, 2c are connected to a common base station controller 3.

First to seventh mobile stations $4a, \ldots, 4g$, are located in the cells 1a, 1b, 1c and each mobile station $4a, \ldots, 4g$ can communicate with the base transceiver station of the cell 1a, 1b, 1c in which it is located.

The base station controller 3 controls the operation of the base transceiver stations 1a, 1b, 1c and is connected to a mobile service switching center (not shown) for the routing of calls.

Figure 2:
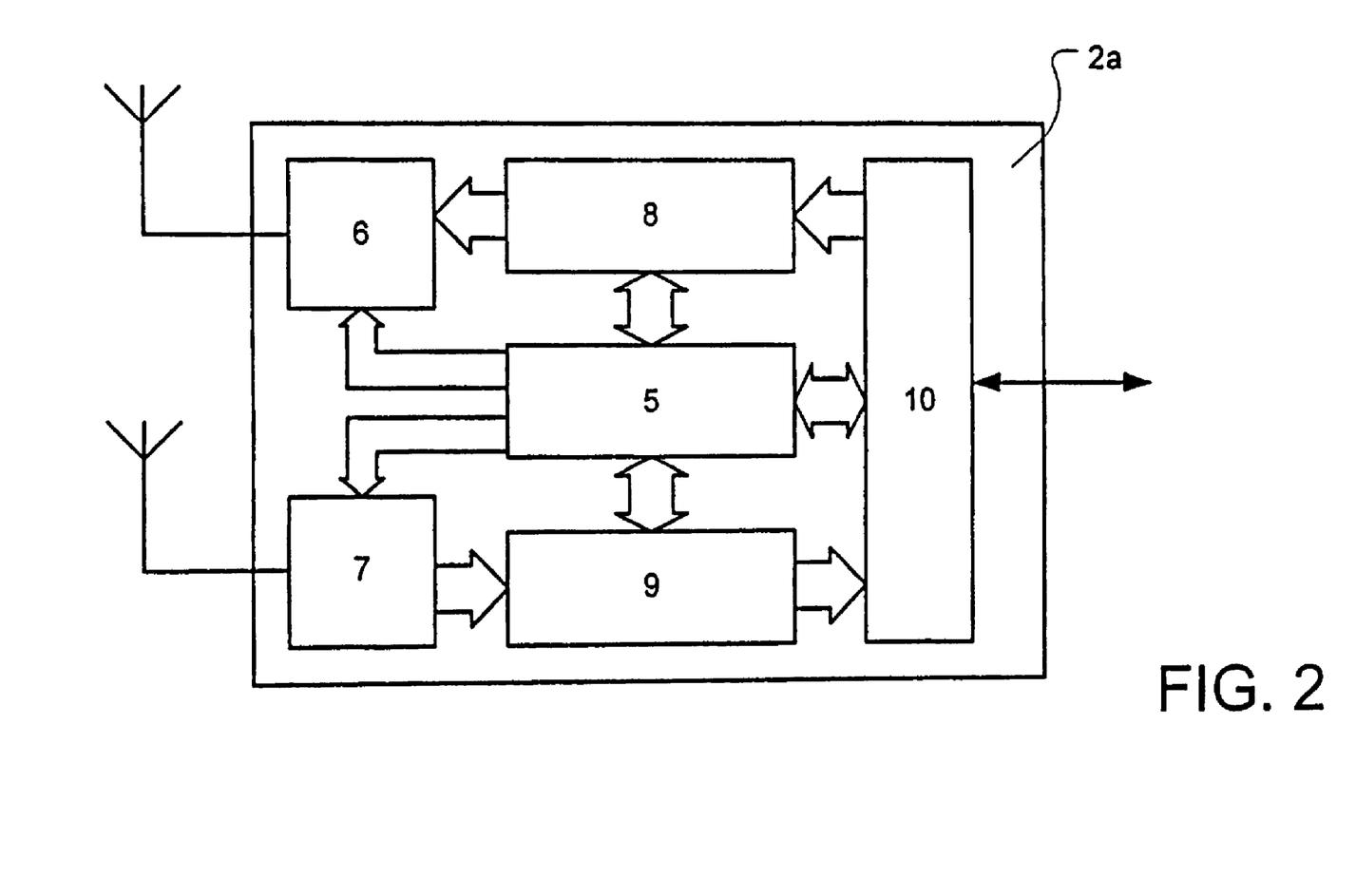
FIG. 2 is a block diagram of a base transceiver station of the network shown in FIG. 1.

Referring to FIG. 2, the first base transceiver station 2a comprises a controller 5, a transmitter 6, a receiver 7, a first digital signal processor 8, a second digital signal processor 9 and a base station controller interface 10. The base station controller interface 10 receives signals from the base station controller 3 and routes them either to the controller 5, in the case of control signals, or to the first digital signal processor 8 in the case of speech signals. The base station controller interface 10 also sends control signals from the controller 5 and speech signals from the second digital signal processor 9 to the base station controller 3.

The first digital signal processor 8 receives speech signals from the base station controller interface 10 and processes them to produce a modulating signal which it provides to the transmitter 6. The transmitter 6 modulates a carrier with the modulating signal and transmits it to a mobile station 4a, 4b, 4c.

The receiver 7 receives signals from the mobile stations 4a, 4b, 4c and outputs baseband signals to the second digital signal processor 9 which processes them to extract the transmitted speech signal data and control data which is then sent to the base station controller 3 by the base station controller interface 10.

The tuning of the transmitter 6 and of the receiver 7, if required, is controlled by the controller 5.

The construction of the second and third base transceiver stations 2b, 2c is substantially identical to that of the first base transceiver station 2a.

Figure 3:
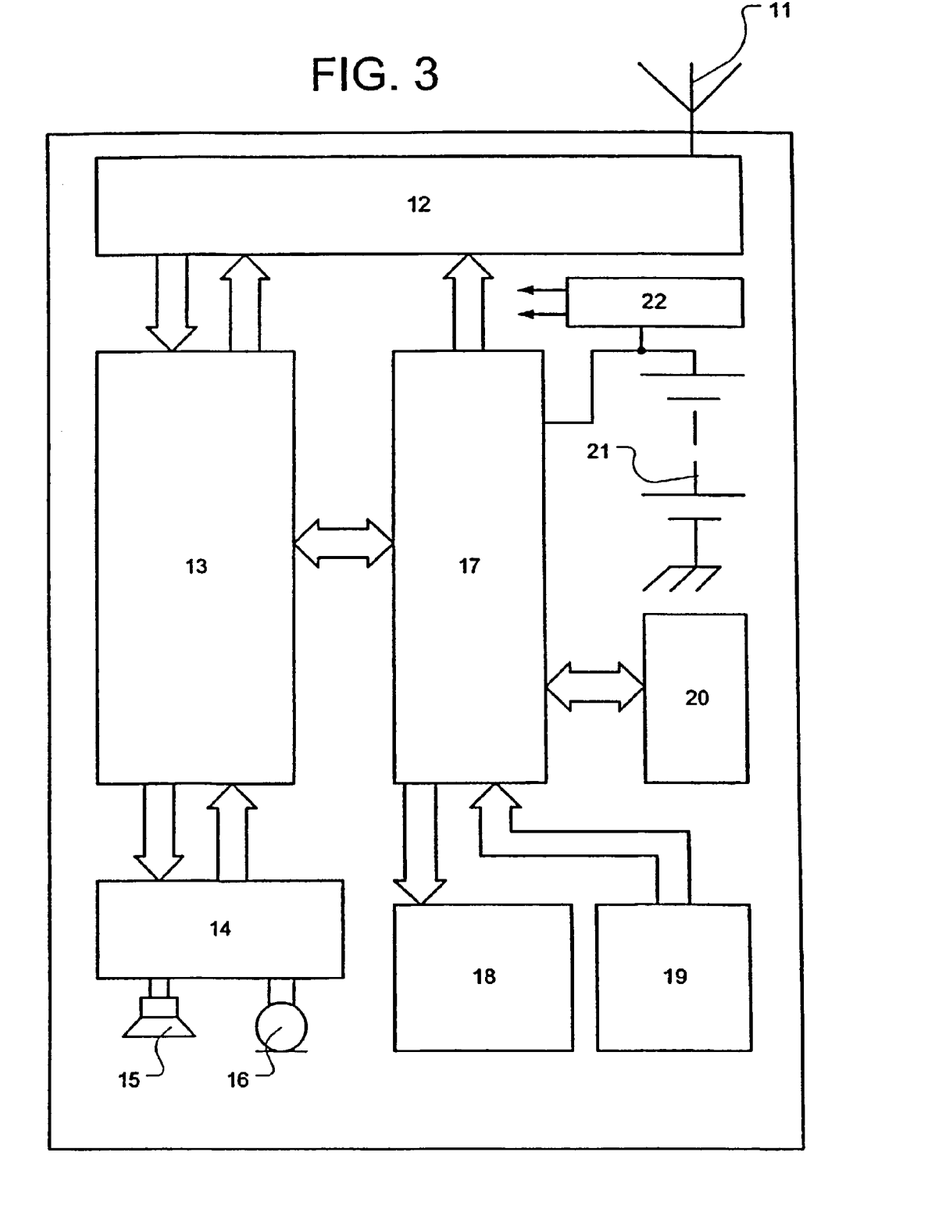
FIG. 3 is a block diagram of a mobile station of the network shown in FIG. 1.

Referring to FIG. 3, the first mobile station 4a comprises an antenna 11, an rf subsystem 12, a baseband digital signal processing subsystem 13, an analog audio subsystem 14, a loudspeaker 15, a microphone 16, a controller 17, a liquid crystal display 18, a keypad 19, memory 20, a battery 21 and a power supply circuit 22.

The rf subsystem 12 contains the rf circuits of the mobile station's telephone's transmitter and receiver and a frequency synthesiser for tuning the mobile station's transmitter and receiver. The antenna 11 is coupled to the rf subsystem 12 for the reception and transmission of radio waves.

The baseband digital signal processing subsystem 13 is coupled to the rf subsystem 12 to receive digital baseband in-phase and quadrature signals therefrom and for sending baseband modulation signals thereto. The baseband digital signal processing subsystem 13 includes codec functions that are well-known in the art and function peculiar to the present invention which are described in detail below.

The analog audio subsystem 14 is coupled to the baseband digital signal processing subsystem 13 and receives demodulated audio therefrom. The analog audio subsystem 14 amplifies the demodulated audio and applies it to the loudspeaker 15. Acoustic signals, detected by the microphone 16, are pre-amplified by the analog audio subsystem 14 and sent to the baseband digital signal processing subsystem 13 for coding.

The controller 17 controls the operation of the mobile station 4a. It is coupled to the rf subsystem 12 for supplying tuning instructions to the frequency synthesiser and to the baseband digital signal processing subsystem 13 for supplying control data and call management data for transmission. The controller 17 operates according to a program stored in the memory 20. The memory 20 is shown separately from the controller 17. However, it may be integrated with the controller 17. A timer for triggering interrupts is also provided by the controller 17.

The display device 18 is connected to the controller 17 for receiving control data and the keypad 19 is connected to the controller 17 for supplying user input data signals thereto.

The battery 21 is connected to the power supply circuit 22 which provides regulated power at the various voltages used by the components of the mobile telephone. The positive terminal of the battery 21 is connected to an analog-to-digital converter (ADC) input of the controller 17 for battery life monitoring.

The other mobile stations 4b, . . . , 4g are similarly constructed.

The present invention is particularly concerned with the generation of modulating signals and the demodulation of received signals. Consequently, the following description will focus on these aspects and it can be assumed that other functions of the mobile stations 42, . . . , 4g and base transceiver stations 2a, 2b, 2c are conventional.

Figure 4:
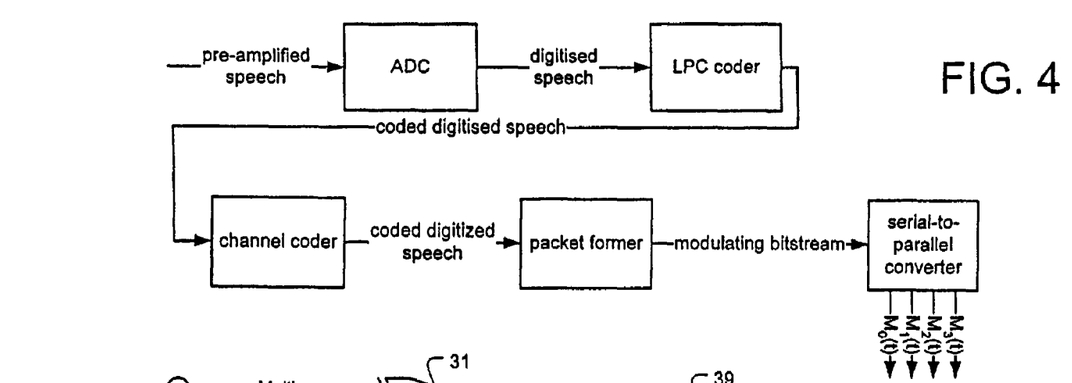
FIG. 4 is a block diagram illustrating the generation of parallel data signals in a transmitter according to the present invention.

Transmission from the First Mobile Station to the First Base Transceiver Station Referring to FIG. 4, during a call, speech detected by the microphone 16 is pre-amplified by the analog audio subsystem 14 and then digitized to produce a stream of digital samples. The digital samples are then encoded by the baseband digital signal processing subsystem 13 in a conventional manner to produce a stream of linear prediction coefficients which are in turn channel coded in a conventional manner to reduce the transmission bandwidth required and/or provide error correction.

The first mobile station 4a will have been allocated a spreading sequence, common to all mobile stations in the same cell, and a transmission offset time, relative to a reference frame for the cell 1a in which the first mobile station 4a is camped and which is unique to the first mobile station 4a, by the base station controller 3. The information will have been communicated to the mobile station 4a in a control channel when it entered the cell 1a in which it is currently camped.

The spreading sequence is defined by two component sequences a[.] and b[.]. In the present example, a[.] comprises {−1, −1, 1} and b[.] comprises {−1, −1, −1, −1, −1, 1, 1, −1, −1, 1, −1, 1, −1}. The actual spreading sequence (c[n]) is given by:—

$c[n] = [a[0]\overline{b}, a[1]\overline{b}, \ldots a[M-1]\overline{b}] = \{1, 1, 1, 1, 1, -1,$
$-1, 1, 1, -1, 1, -1, 1, 1, 1, 1, 1, -1, -1, 1, 1,$
$-1, 1, -1, 1, -1, -1, -1, -1, -1, 1, 1, -1, -1, 1,$
$-1, 1, -1\}$ where M is 3, i.e. the number of elements in a[.].

c[n] is represented in the mobile phone 4a by the binary sequence 1111100110101111100110101000001100101010.

The spreading sequence can be used in L forms which are subject to different phase modulations for transmitting L bits of the channel coded signal in parallel. L is the number of elements in b[.]. The set of spreading sequences is defined by:—

$$c_f[n] = c[n]e^{j2\pi\left(\frac{fn}{N}\right)}$$

where f=0, . . . 12, i.e. L−1, and n=0, . . . , ML−1 and N=ML.

Thus, for each symbol, the spreading sequence is in effect phase modulated by f cycles of a stepped sine wave. Thus, when f is 0, no phase modulation is applied but if f is 2, for example, the spreading sequence is phase modulated by a stepped sine wave having a period which is half of the symbol period.

In the present example. values of f of 0, 1, 2, 3 are used. However, other sets of values for f such as 0, 1, 2, 3, 4, 5, 6, 7, 8, 9, 10, 11, 12, which is the largest usable set in the present example, or 0, 2, 4, 6, for example, could be used.

It has been discovered that the peak to average power ratio (PAPR) for a transmitter according to the present invention is a complex function of the spreading code and the values of f used and that certain values of f are associated with high peak power values which adversely affect the overall PAPR. These can be determined experimentally and avoided when selecting values of f for a transmitter.

The coded digital speech signals are combined with control bits. These bits are divided into four parallel bitstreams $M_0(t)$, $M_1(t)$, $M_2(t)$, $M_3(t)$.

Figure 5:
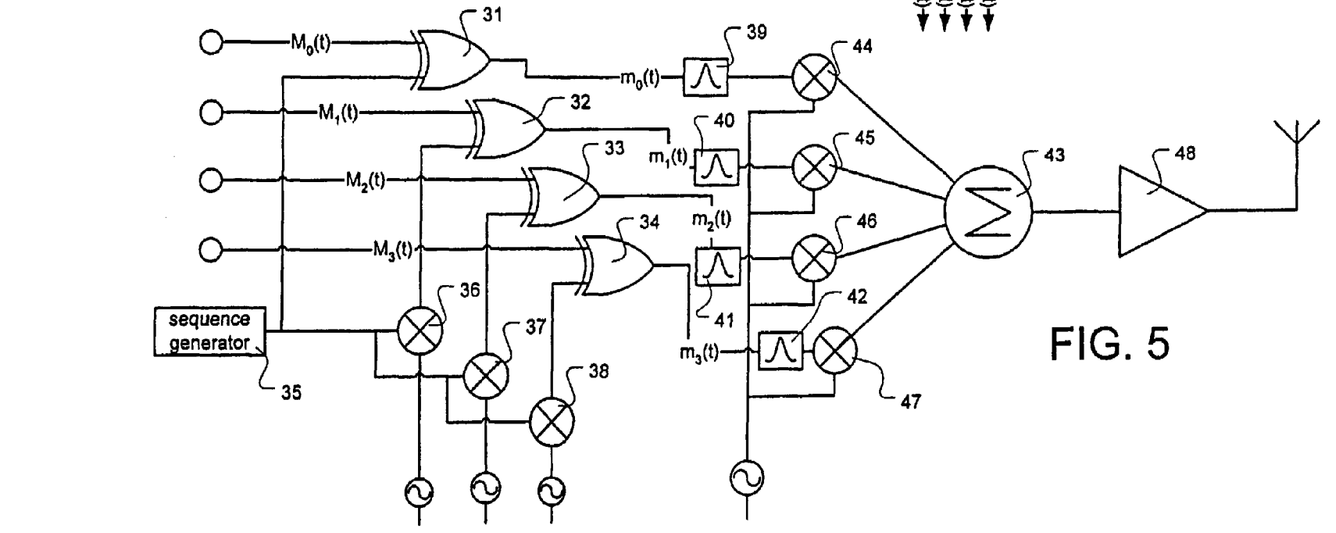
FIG. 5 is a block diagram illustrating spectrum spreading and modulation in a transmitter according to the present invention.

Referring to FIG. 5, the means for modulating a carrier with the four bitstreams $M_0(t)$, $M_1(t)$, $M_2(t)$, $M_3(t)$ comprises first to fourth exclusive-OR gates 31, 32, 33, 34, a sequence generator 35 for outputting the spreading sequence, first, second and third phase modulators 36, 37, 38 for phase modulating the output of the sequence generator 35 by different spectrum rotating functions $e^{j2\pi(\tilde{m}/N)}$, first to fourth pulse shapers 39, 40, 41, 42 for shaping the outputs of respective exclusive-OR gates 31, 32, 33, 34, fourth to seventh phase modulators 43, 44, 45, 46 for phase modulating a carrier from an oscillator 47, implemented by the mobile station's synthesiser, with the outputs of the pulse shapers 39, 40, 41, 42, a summer 43 for combining the outputs of the fourth to seventh phase modulators 44, 45, 46, 47 and a class A power amplifier 48. The outputs of the sequence generator 35 and the first to third phase modulators 36, 37, 38 are applied to inputs of respective exclusive-OR gates 31, 32, 33, 34. The other inputs of the exclusive-OR gates 31, 32, 33, 34 receive respective ones of the four bitstreams $M_0(t)$, $M_1(t)$, $M_2(t)$, $M_3(t)$.

It will be appreciated that the exclusive-OR gates 31, 32, 33, 34, the sequence generator 35, the first to third phase modulators 36, 37, 38 and the pulse shapers 39, 40, 41, 42 are implemented computationally in the baseband digital signal processing subsystem 13.

The operation of the system shown in FIG. 5 will now be described. The four bitstreams $M_0(t)$, $M_1(t)$, $M_2(t)$, $M_3(t)$ are exclusive-ORed with respective spreading sequences having different phase characteristics. The four resulting modulation bit streams $m_0(t)$, $m_1(t)$, $m_2(t)$, $m_3(t)$ are then $$m_0(t) = M_0(t)c[n]$$
$$m_1(t) = M_1(t)c[n]e^{j2\pi\left(\frac{1n}{N}\right)}$$
$$m_2(t) = M_2(t)c[n]e^{j2\pi\left(\frac{2n}{N}\right)}$$
$$m_3(t) = M_3(t)c[n]e^{j2\pi\left(\frac{3n}{N}\right)}$$

where $n = (t \operatorname{div} T_c) \operatorname{mod} N$,
$M_i(t)$ is the ith data bitstream and $T_c$ is the chip period.

The modulation bit streams $m_0(t)$, $m_1(t)$, $m_2(t)$, $m_3(t)$ are then pulse shaped using a square root cosine form, with a roll-off factor of 0.5, and then used to BPSK modulate respective carrier signals from the same source to produce four modulated carriers which are then summed and transmitted. The resulting signal is of non-constant amplitude and therefore a class A power amplifier 48 is required for amplifying it for transmission.

The gain of the amplifier 48 is controlled by the controller 17 on the basis of the signal strength of signals received from the first base transceiver station.

The sequence output by the sequence generator 35 is synchronized with the cell's reference time frame but offset by the offset allocated to the mobile station 4a. In the present example, the offsets available for mobile station 4a, 4b, 4c using the spreading sequence c[n] are 0, $L.T_C$ and $2L.T_C$.

Reception at the Fist Base Transceiver Station

Figure 6:
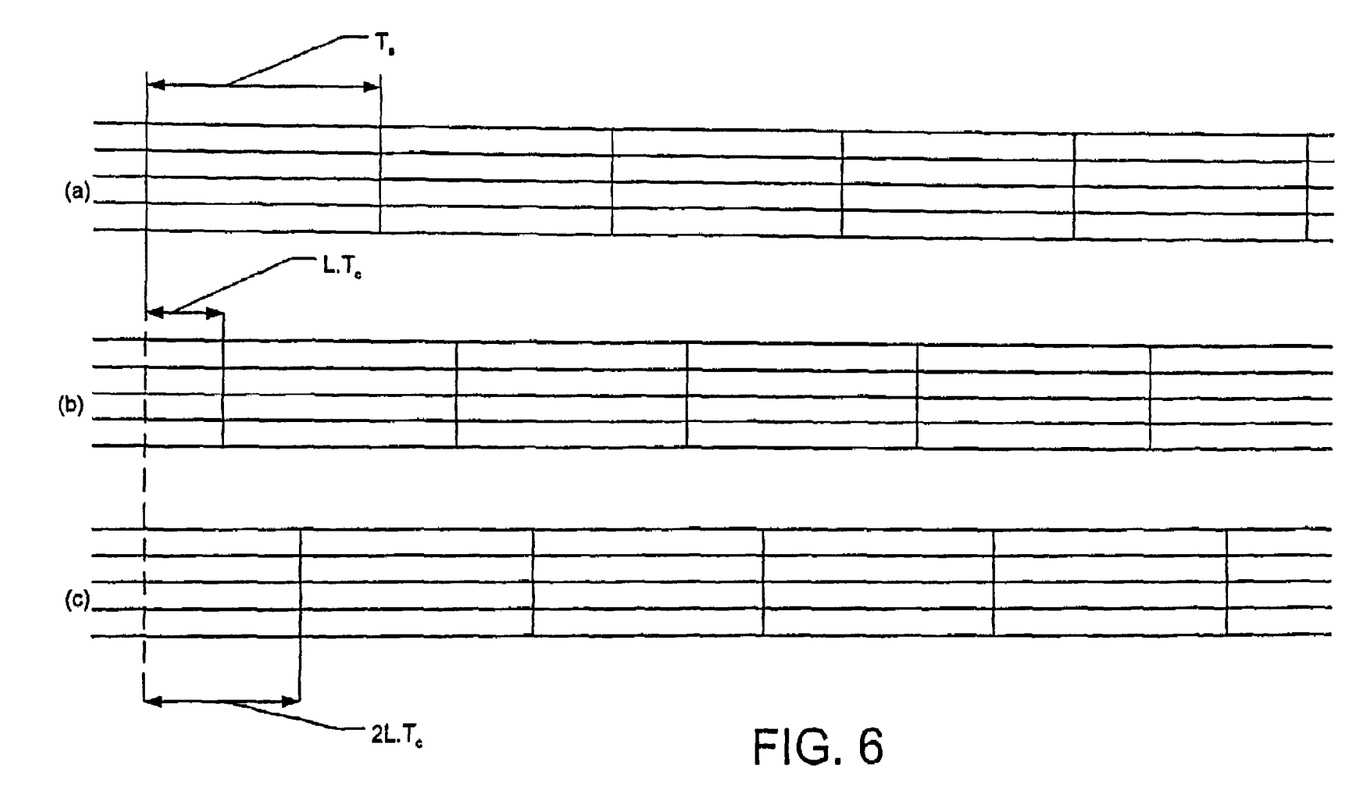
FIG. 6 illustrates the transmissions from three mobile stations in the same cell of the network shown in FIG. 1.

Referring to FIG. 6, the signals (a), (b), (c) from the first, second and third mobile stations 4a, 4b, 4c use the same carrier frequency, spreading sequence and f values. However, at the first base transceiver station 2a, the symbols of the second mobile station's signal lag those of the first mobile station's signal by $L.T_C$. Similarly, the symbols of the third mobile station's signal lag those of the first mobile station's signal by $2L.T_C$. A timing advance mechanism is employed by the mobile stations 4a, 4b, 4c so that their transmissions are received at the first base transceiver station 2a aligned with the cell reference time frame.

Referring again to FIG. 2, the signals from the first, second and third mobile stations 4a, 4b, 4c are received by the receiver 7 and down convened to baseband and output as in-phase and quadrature values to the second digital signal processor 9.

Figure 7:
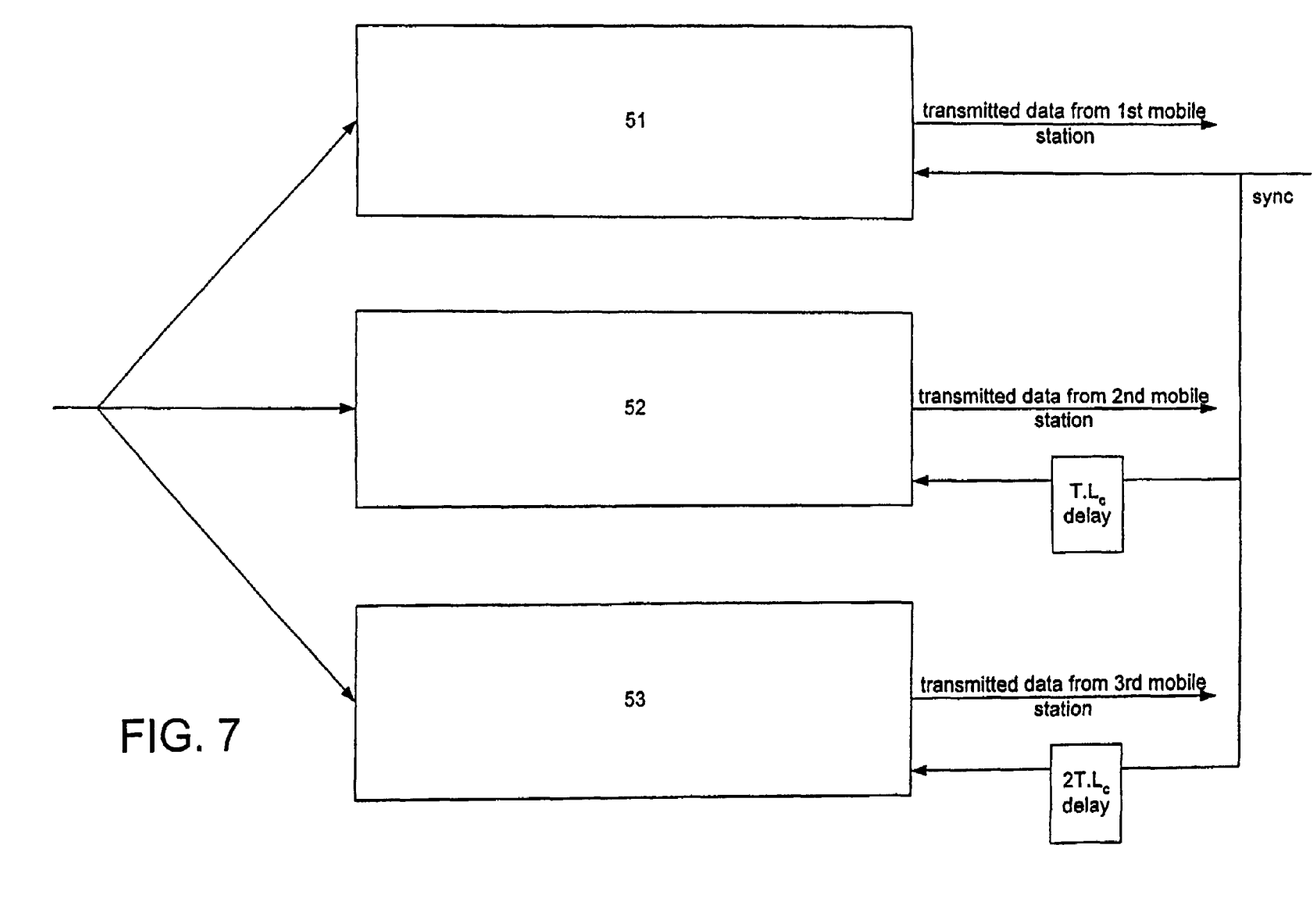
FIG. 7 is a block diagram of part of the receiver of a mobile phone network base station according to the present invention.

Referring to FIG. 7, the second digital signal processor 9 computationally implements first, second and third despreading detectors 51, 52, 53 for respective mobile stations 4a, 4b, 4c. The despreading detectors 51, 52, 53 are synchronized with the cell reference time frame with the second and third despreading detectors lagging the first by $L.T_C$ and $2L.T_C$.

Figure 8:
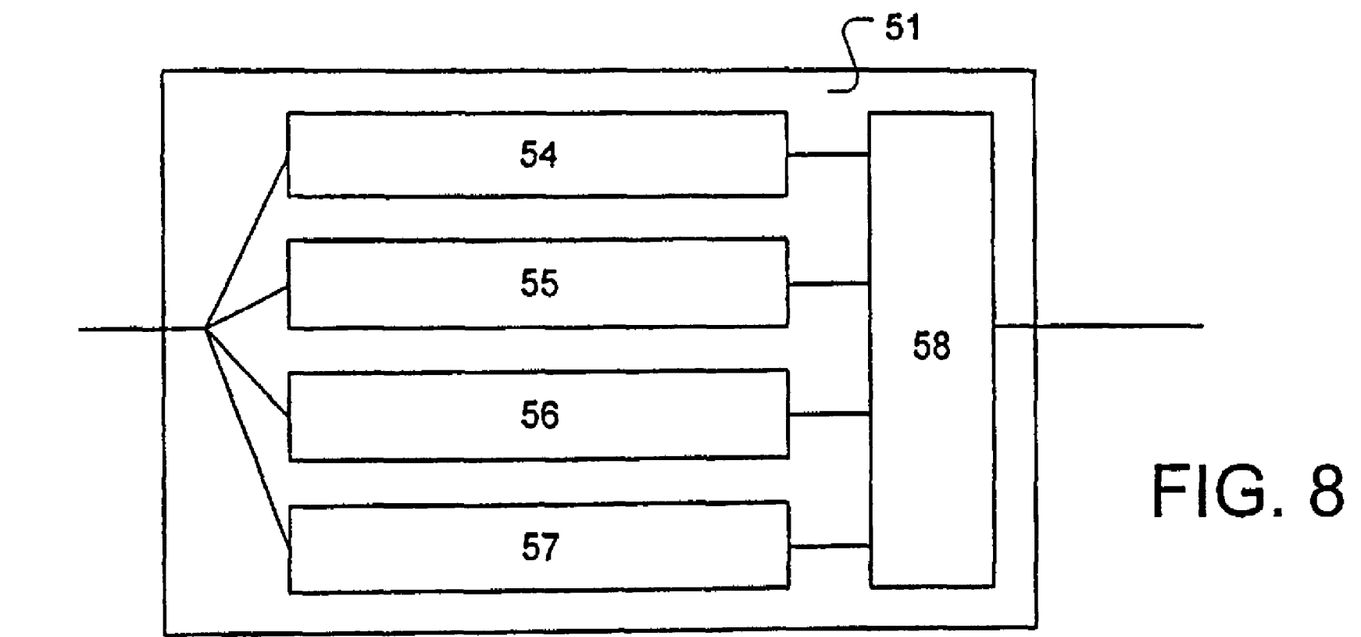
FIG. 8 is a block diagram of a despreading detector as used in the receivers of the base stations and mobile station in FIG. 1

Referring to FIG. 8, the first despreading detector 51 comprises first, second, third and fourth channels 54, 55, 56, 57 for decoding respective one of the parallel bitstreams of the received signal from the first mobile station 4a and a decision processor and format converter 58 for converting the 4-bit wide parallel format in which the bits are transmitted, into the format (e.g. serial or 8- or 16-bit parallel) required for subsequent processing such as channel and speech decoding.

Figure 9:
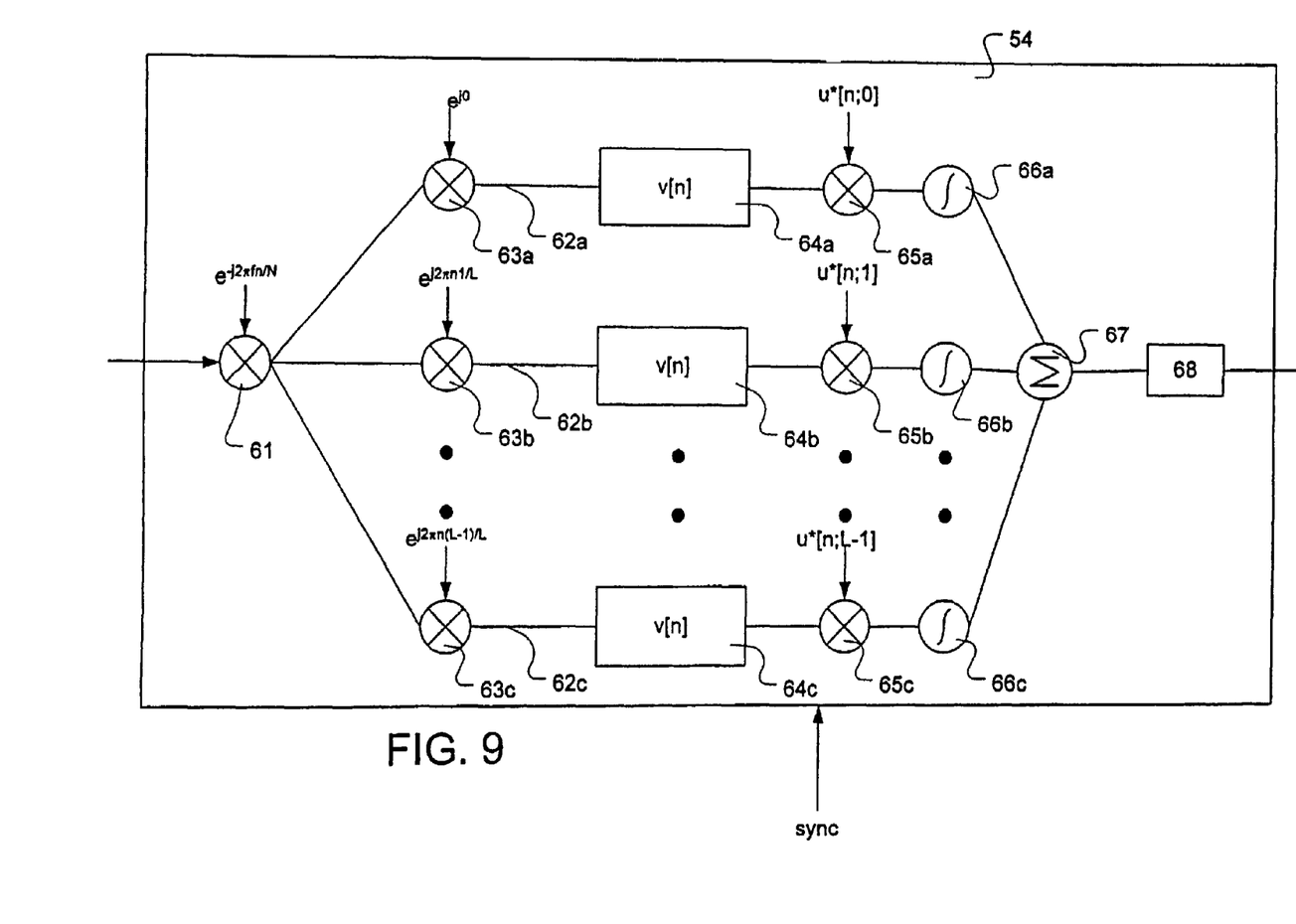
FIG. 9 is a block diagram of a channel of a despreading detector as shown in FIG. 8.

Referring to FIG. 9, the first channel 54 of the first despreading detector 51 comprises a phase modulator 61 for removing any phase modulation impressed on the spreading sequence at the mobile station 4a. Following the phase modulator 61, the signal path divides into L parallel branches 62a, 62b, 62c. Each branch comprises a respective first multiplier 63a, 63b, 63c, a respective filter 64a, 64b, 64c, a respective second multiplier 65a, 65b, 65c and a respective integrator 66a, 66b, 66c. The outputs of the branches 62a, 62b, 62c are input to a summer 67.

The first multipliers 63a, 63b, 63c multiply the output of the phase modulator 61 by a signal of the form $e^{j2\pi nP/L}$ where P is the index of the branch and is in the range $0, \ldots, L-1$. The outputs of the first multipliers 63a, 63b, 63c are filtered by respective ones of the filters 64a, 64b, 64c. The filters 64a, 64b, 64c all have the same transfer function v[n] which is the inverse of the sequence a[.] and aperiodic. In other words, v[n] is the inverse of the filter whose transfer function is such that is would produce the sequence a[.] in response to an impulse. Consequently, v[n] produces an impulse when the sequence a[.] is input.

The second multipliers 65a, 65b, 65c and the integrators 66a, 66b, 66c combine to form respective matched filter/correlators. The sequences u*[n, P] applied to the second multipliers 65a, 65b, 65c are the product of the spreading sequence (c[n]) and the transfer function (v[n]) and the respective phase rotation function $e^{j2\pi nP/L}$ for each branch. Thus, $$u^*[n; P] = c[n]v[n]e^{j2\pi a\frac{P}{L}}$$

A consequence of this is that these sequences (u*[n,P]) are independent of the sequence a and determined by the sequence b.

v[n] is real valued and of infinite duration with exponentially decreasing magnitude. However, in practice it is truncated without appreciable loss of performance. u*[n;P] can also be truncated to a finite length and the length actually required is much shorter than the truncated length of v[n] resulting a correlator that is less complicated that the inverse filter.

The outputs of the integrators 66a, 66b, 66c are summed by the summer 67 and the peak output value, occurring in a window in which a pulse signal is expected to occur on the basis of the first mobile station's time offset and path conditions, is determined by a peak detection process 68.

The value of the peak could simply be compared with a threshold to determine whether the received bit is a 1 or a 0. However, in order to reduce the effect of cross-talk between the parallel bitstreams making up the transmission from the first mobile station 4; the outputs of the four channels 54, 55, 56, 57 are processed together by the decision processor and format converter 58.

The decision processor and format converter 58 has a model of the expected outputs of the channels for each possible transmitted four-bit value, allowing for interference between the four bitstreams, which it modifies on the basis of channel estimations that are repeatedly made. The outputs of the four channels 58 are compared to the modified predicted outputs, e.g. using a least mean squares algorithm, and four bits providing the model having the best match to the received signal are output in the appropriate format. The output signal is then decoded in a conventional manner to extract and reproduce the original speech signal and any control data transmitted from the first mobile station 4a.

Chip synchronization and channel estimation are obtained by means of periodically transmitted training symbols, which are included with the speech data transmitted by the mobile stations 4a, 4b, 4c. In order to avoid interference between mobile stations, mobile stations whose relative offset is less than the maximum delay of any channel are given orthogonal training sequences of length L. The sequences can be reused by mobile stations whose transmissions are offset by more than the maximum channel delay.

The second and third despreading detectors 52, 53 are substantially identical to the first despreading detector 51 and operate in the same manner save that their timing is offset by $LT_C$ and $2LT_C$ respectively.

Transmission from the First Base Transceiver Station

Transmission from the first base station 2a is substantially the same as transmission from the first mobile station 4a, save that the summer 43 (FIG. 5) combines phase modulated signals from additional sources. All of the modulating signals are produced by the first digital signal processor 7. The phase modulated signals all have the same carrier frequency and spreading sequence and differ only in the timing of the sequence start. The signals for the first mobile station 4a have a zero offset relative to the reference frame for the spreading sequence, the signals for the second mobile station 4b have an offset of $LT_C$ and the signals for the third mobile station 4c have an offset of $2LT_C$.

Reception at the First Mobile Station

Referring again to FIG. 3, the baseband digital signal processing subsystem 13 is programmed to implement a despreading detector as shown in FIG. 8. The despreading detector operates in the same manner as those of first base transceiver nation 2a as described above.

Signals received by the first mobile station 4a are convened to baseband by the rf subsystem 12 and then processed by the baseband digital signal processing subsystem 13 to extract speech for output by the loudspeaker 16 and control signals which are sent to the controller 17.

Figure 10:
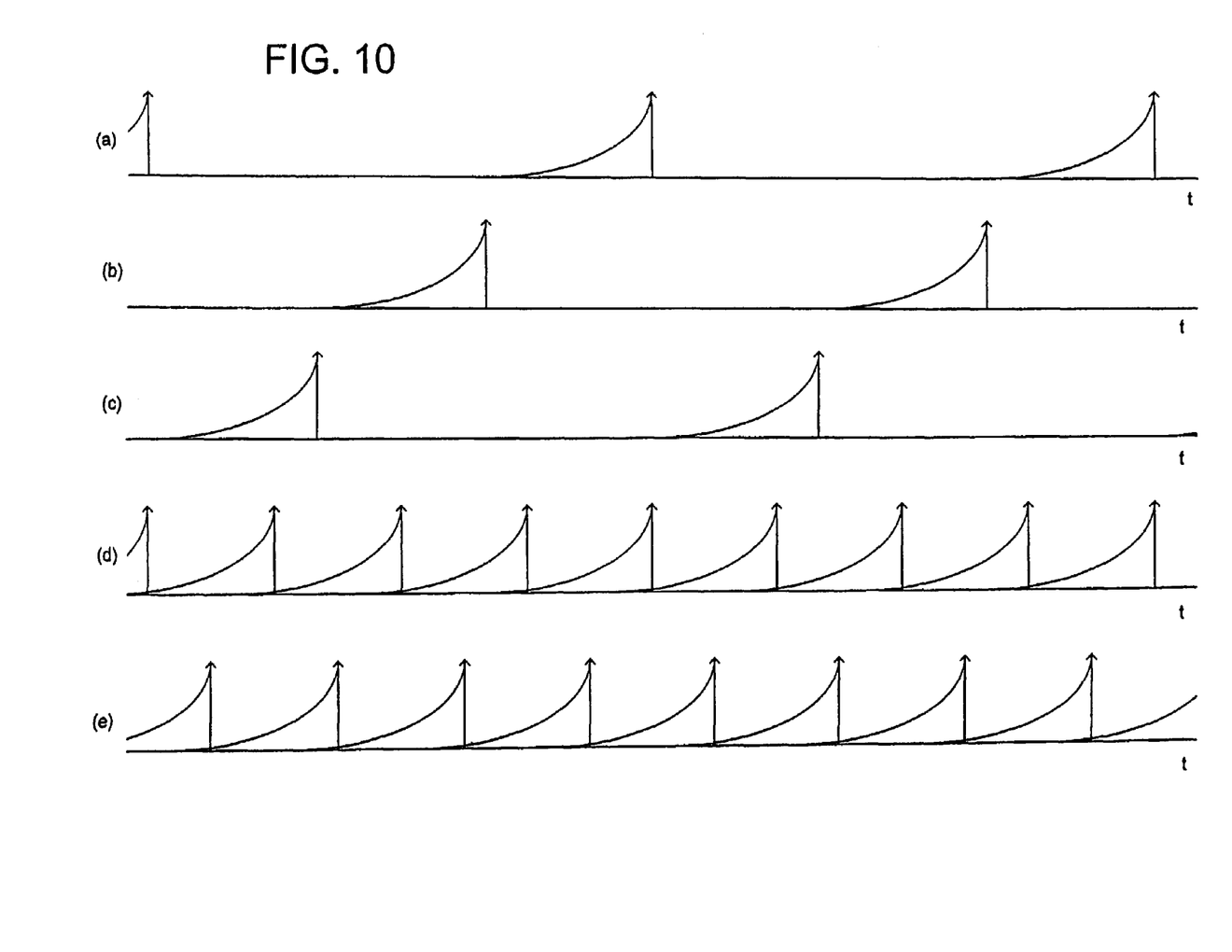
FIG. 10 is a diagram illustrating the advantages of the present invention over conventional CTDMA.

Referring to FIG. 10, waveforms (a), (b) and (c) represent the envelopes of the outputs of the despreading detectors of the first base transceiver station 2a in the time domain for multipath signal from the first, second and third mobile stations 4a, 4b, 4c. It can be seen that the delayed signal effects have substantially disappeared before a four-bit group of another transmission is detected. Thus, there is very little intracell interference.

Waveforms (d) and (e) are the responses of conventional CTDMA receivers to two multipath signals under the same propagation conditions. It can be seen that there is a limit to the time offset between the transmissions if the delayed transmissions from one station are not to interfere with the transmissions of the other. In the example shown, by applying the present invention three stations can share the same resources as two using conventional CTDMA and at the same time obtain reduced intracell interference.

In the system described above:

(a) four of a possible L orthogonal codes, specified by $\{f_i\}=\{i+l*M\}$ (l=0, ... L−1) for i∈[O, M−1]), are used to transmit up to 4 data bits in parallel for a user in the ith cell (up to L may be transmitted in parallel);

(b) users within one cell share the same spreading sequence but are time-offset by at least L chips, bit-by-bit cyclically, to avoid or reduce intracell interuser interference;

(c) M orthogonal spreading sequences specified by i=0, ... M−in $\{f\}=\{i+l*M\}$ are used for respective cells.

The choice of the number of bits transmitted in parallel depends on balancing the desire for the maximum number of concurrent transmissions with receiver complexity.

Therefore with $\{f_i\}=\{i+l*M\}$ (l=0, ... L−1) (ie[0, M−1]), the users in cell i are specified by the same phase shift set (i.e. values off) for multicode transmission of up to L bits in parallel, and are time offset by at least L chip periods cyclically at the symbol level. The users of different cell are separated by using different spreading sequences which are orthogonal. In the example given, it is the a sequence that differs between cells, the b sequence being the same. It can be seen that this simplifies receiver design since only v(n) needs to be changed when a mobile station moves from one cell to another. In practice this simply involves changing parameters in the software routine implementing v[n]. The length of the tiered code a[.] and b[.], together with the chip rate, form the degrees of freedom for a system design.

With a system according to the present invention, the serial-to-parallel converted data streams of any user are spread by complex codes, corresponding to a group of orthogonal codes. These parallel data stream can be detected using maximum likelihood detector (M.LD) at the receiver, for which a RAKE combiner can be also applied for combining the power of a few paths. Whilst users within one cell are separated by a cyclic time offset, as in CTDMA, different groups of orthogonal codes are used in different cells. The parallel transmission compensates for the loss of spectrum efficiency due to the required time offset between users.

An example of MLD will now be described. The receiver digital signal processor is programmed to determine the value of a data bit according to the rule:

$$e^2 = \min_{\bar{D}} \left| \bar{p} - HR\hat{D} \right|^2$$

where $$\bar{D} = [d[0], d[1], \ldots, d[L-1]]^T$$

$$H = \begin{bmatrix} \bar{H}^T[i;0] & 0 & 0 & 0 \\ 0 & \bar{H}^T[i;1] & 0 & 0 \\ 0 & 0 & \ddots & 0 \\ 0 & 0 & 0 & \bar{H}^T[i;L-1] \end{bmatrix}$$

$$R = \begin{bmatrix} \bar{R}[0] & \bar{R}[1] & \ldots & \bar{R}[L-1] \\ \bar{R}[-1] & \bar{R}[0] & \ldots & \bar{R}[L-2] \\ \vdots & \vdots & & \vdots \\ \bar{R}[-L+1] & \bar{R}[-L+2] & \ldots & \bar{R}[0] \end{bmatrix}$$

$$\bar{H}[i;l] = \left[ h^{(i)}[\gamma] e^{-j2\pi \frac{i+lM}{LM}(\gamma+\tau_1-\tau_2)} \right]^T \text{ for } \gamma = 0, 1, \ldots, \varsigma$$

$$\bar{R}[l] = \left[ \sum_i b[l]b[l+\gamma+\tau_1(mod)L-\tau_2(mod)L] e^{j2\pi \frac{l}{L}i} \right]^T \text{ for } \gamma = 0, 1, \ldots, \varsigma$$

$\bar{d}$ is the transmitted data, $V$ represents all possible combinations of bits transmitted in parallel, $\rho$ is the decoder output, $H$ is the channel responds.

It will be appreciated that receiving systems embodying the present invention may employ antenna diversity.

In embodiments of the present invention, phase modulated versions of a common spreading sequence provide a family of good invertable sequences. For a tiered code with components a[.] of length M and b[.] of length L, M orthogonal groups are obtained, each consisting of L orthogonal spectra. Unlike conventional DSCDMA systems, users are separated in time and can therefore share the same spreading sequence. Up to L orthogonal codes are employed for parallel transmission of data by each user. In a mobile phone network system, cell separation can be supported using up to M groups. Despite the large spreading sequence family, the spreading sequence acquisition and tracking are simpler than is the case in DS-CDMA systems.

In preferred embodiments, the despread signal is obtained by inverse filtering of sequence a[.] and matched filtering of the phase shifted b[.] sequence in convolution with its inverted sequence. For a single path channel, the orthogonality between the parallel data is realized by phase shifts to sequence b[.], whereas in multipath channels, the matched filtering produces a correlation period of 2L. However, unwanted paths are suppressed since the spectrum of b[.] is nearly white. Thus, synchronizing the receiver with the best path signals, signals from other worse paths are suppressed.

The present invention provides more flexibility suitable for "soft radio" systems. The spreading code may be chosen to provide more capacity in different channels; e.g. a macro-cell with large a propagation time spread may require a larger gap between consecutively offset transmitters and therefore a larger value of L. However, in small pico-cells, larger values of M can be used to accommodate for cells in a small area.

The invention claimed is:

1. A method, comprising:

providing digital data to be transmitted to a remote station as a plurality of parallel bitstreams;

phase modulating said bitstreams with respective orthogonal or substantially orthogonal spectrum spreading signals to produce a plurality of modulating signals;

phase modulating respective instances of a carrier with said modulating signals to produce a plurality to modulated carrier instances; and summing the modulated carrier instances and transmitting the result of said summation.

2. A method according to claim 1, further comprising:

producing each spreading signal by phase modulating a common finite spreading sequence with a respective cyclic signal, said cyclic signals being such that each completes an integer number of cycles in the duration of said spreading sequence.

3. A method according to claim 2, wherein said cyclic signals are substantially sinusoidal.

4. A method according to claim 3, wherein said cyclic signals are stepped sine waves, each step having the same duration as chips of said spreading sequence.

5. A method according to claim 1, wherein one of the spreading signals comprises a finite spreading sequence, further comprising:

producing each of the other spreading signals by phase modulating said finite spreading sequence with a respective cyclic signals, said cyclic signals being such that each completes an integer number of cycles in the duration of said spreading sequence.

6. A method according to claim 5, wherein said cyclic signals are substantially sinusoidal.

7. A method according to claim 6, wherein said cyclic signals are stepped sine waves, each step having the same duration as chips of said spreading sequence.

8. A method according to claim 1, wherein at least one of said spreading signals comprises a spreading sequence c[.] that is derived from a first code a[.] and a second code b[.] according to $$c[n]=\lfloor a[0]\vec{b}, a[1]\vec{b},\ldots, a[M-1]\vec{b}\rfloor.$$

9. A method according to claim 8, wherein the Fourier transforms of the first and second codes satisfy:

$$s[t] \leftrightarrow S(e^{j\omega}) \neq 0 \text{ for all } \omega$$

where s and S represent the first and second codes in the time and frequency domains respectively.

10. A method according to claim 1, wherein said bitstreams comprise bits of a single digital signal such that groups of bits of said single digital signal are transmitted in parallel.

11. A method of receiving a signal produced by a method according to claim 1, the method comprising:
producing a baseband signal, comprising components corresponding to the modulating signals, from a received radio frequency signal; and
processing the baseband signal by processes configured to extract the data from each of the modulating signals.

12. A method according to claim 11, further comprising:
combining data bits extracted by said processes into a single data signal.

13. A method according to claim 11, further comprising:
mapping the outputs of said processes onto a transmitted parallel bit pattern using a maximum likelihood algorithm; and
outputting said parallel bit pattern.

14. A method according to claim 13, further comprising:
combining data bits extracted by said processes into a single data signal.

15. A method according to claim 11, wherein at least all but one of said processes comprises:
phase modulating the baseband signal by the inverse of a respective one of said cyclic signal to produce a first signal;
phase modulating instances of the first signal by respective cyclic signals of the form $e^{j2\pi nP/L}$ where P comprises the set of values in the range $0,\ldots,L-1$, and L is the length of the second code to produce L second signals;
filtering each of said second signals with a filter having a transfer function that is the inverse of the first code to produce respective third signals;
correlating the third signals with corresponding reference signals; and
summing the results of the correlations.

16. A method according to claim 15, further comprising:
combining data bits extracted by said processes into a single data signal.

17. A method according to claim 15, further comprising:
mapping the outputs of said processes onto a transmitted parallel bit pattern using a maximum likelihood algorithm; and
outputting said parallel bit pattern.

18. A method according to claim 17, further comprising:
combining data bits extracted by said processes into a single data signal.

19. The method of claim 1, wherein the spreading signals comprise a common finite spreading sequence.

20. The method of claim 11, wherein the spreading signals comprise a common finite spreading sequence.

21. An apparatus, comprising:
a source of digital data to be transmitted to a remote station as a plurality of parallel bitstreams;
a first phase modulator configured to phase modulate said bitstreams with respective orthogonal or substantially orthogonal spectrum spreading signals to produce a plurality of modulating signals;
a second phase modulator configured to phase modulate respective instances of a carrier with said modulating signals to produce a plurality to modulated carrier instances; and
a summer configured to sum the modulated carrier instances.

22. The apparatus of claim 21, wherein the first phase modulator comprises a spreading signal source configured to produce each spreading signal by phase modulating a common finite spreading sequence with a respective cyclic signal, said cyclic signals being such that each completes an integer number of cycles in the duration of said spreading sequence.

23. The apparatus of claim 22, wherein said cyclic signals are substantially sinusoidal.

24. The apparatus of claim 23, wherein said cyclic signals are stepped sine waves, each step having the same duration as chips of said spreading sequence.

25. The apparatus of claim 21, wherein the first phase modulator comprises a spreading signal score configured to produce one of the spreading signals by generating a finite spreading sequence and to produce the other spreading signals by phase modulating said finite spreading sequence with a respective cyclic signal, said cyclic signals being such that each completes an integer number of cycles in the duration of said spreading sequence.

26. The apparatus of claim 25, wherein said cyclic signals are substantially sinusoidal.

27. The apparatus of claim 25, wherein said cyclic signals are stepped since waves, each step having the same duration as chips of said spreading sequence.

28. The apparatus of claim 21, wherein at least one of said spreading signals comprises a spreading sequence c[.] that is derived from a first code a[.] and a second code b[.] according to $$c[n]=\lfloor a[0]\vec{b}, a[1]\vec{b},\ldots, a[M-1]\vec{b}\rfloor.$$

29. The apparatus of claim 28, wherein the Fourier transforms of the first and second codes satisfy $$s[t] \leftrightarrow S(e^{j\omega}) \neq 0 \text{ for all } \omega$$

where s and S represent the first and second codes in the time and frequency domains respectively.

30. The apparatus of claim 21, wherein the source of digital data signals includes a generator configured to generate said bitstreams from a single digital signal such that groups of bits of said single digital signal are transmitted in parallel.

31. The apparatus of claim 30, wherein said generator comprises a digital signal processor.

32. The apparatus of claim 21, wherein the first phase modulator comprises a digital signal processor.

33. The apparatus of claim 21, wherein the second phase modulator comprises a plurality of analog phase modulators.

34. A mobile phone including the apparatus of claim 21.

35. A base station of a mobile phone network including the apparatus of claim 21.

36. The apparatus of claim 21, wherein the spreading signals comprise a common finite spreading sequence.

37. An apparatus, comprising:
a receiver configured to receive a signal produced by a method comprising providing digital data to be transmitted to a remote station as a plurality of parallel bitstreams, phase modulating said bitstreams with respective orthogonal or substantially orthogonal spectrum spreading signals to produce a plurality of modulating signals, phase modulating respective instances of a carrier with said modulating signals to produce a plurality to modulated carrier instances, and summing the modulated carrier instances and transmitting the result of said summation, the receiver comprising a radio frequency processor configured to produce a baseband signal, comprising components corresponding to the modulating signals, from a received radio frequency signal; and a processor configured to process the baseband signal by processes configured to extract the data from each of the modulating signals.

38. The apparatus of claim 37, wherein the processor is configured to combine the extracted data bits into a single data signal.

39. The apparatus of claim 37, wherein the processor is configured to map the outputs of said processes onto a transmitted parallel bit pattern using a maximum likelihood algorithm and to output said parallel bit pattern.

40. The apparatus of claim 39, wherein the processor is configured to combine the extracted data bits into a single data signal.

41. The apparatus of claim 37, wherein at least all but one of said processes comprises:

phase modulating the baseband signal by the inverse of a respective one of said cyclic signal to produce a first signal;

phase modulating instances of the first signal by respective cyclic signals of the form $e^{j2\pi nP/L}$ where P comprises the set of values in the range $0, \ldots, L-1$, and L is the length of the second code to produce L second signals;

filtering each of said second signals with a filter having a transfer function that is the inverse of the first code to produce respective third signals; and correlating the third signals with corresponding reference signals and summing the results of the correlations.

42. The apparatus of claim 41, wherein the processor is configured to combine the extracted data bits into a single data signal.

43. The apparatus of claim 41, wherein the processor is configured to map the outputs of said processes onto a transmitted parallel bit pattern using a maximum likelihood algorithm and to output said parallel bit pattern.

44. The apparatus of claim 43, wherein the processor is configured to combine the extracted data bits into a single data signal.

45. The apparatus of claim 37, wherein the processor comprises a digital signal processor.

46. A mobile phone including the apparatus of claim 37.

47. A base station of a mobile phone network including the apparatus of claim 37.

48. The apparatus of claim 37, wherein the spreading signals comprise a common finite spreading sequence.

49. A network, comprising:

a plurality of mobile phones; and a base station in communicative relation to the plurality of mobile phones, the base station including a receiver comprising:

a radio frequency processor configured to produce a baseband signals, comprising components corresponding to the modulating signals, from a received radio frequency signal, and a processor configured to process the baseband signal by processes configured to extract the data from each of the modulating signals; and each mobile phone including a transmitter comprising:

a source of digital data to be transmitted to a remote station as a plurality of parallel bitstreams;

a first phase modulator configured to phase modulate said bitstreams with respective orthogonal or substantially orthogonal spectrum spreading signals to produce a plurality of modulating signals;

a second phase modulator configured to phase modulate respective instances of a carrier with said modulating signals to produce a plurality to modulated carrier instances; and a summer configured to sum the modulated carrier instances; wherein the mobile phones employ the same carrier frequency and spreading signals for communication with the base station, each mobile phone applying the spreading signals in a time offset manner relative to the use of the spreading signals by each of the other mobile phones.

50. The network of claim 49, wherein the spreading signals comprise a common finite spreading sequence.

51. An apparatus, comprising:

digital data source means for providing digital data to be transmitted to a remote station as a plurality of parallel bitstreams;

first means for phase modulating said bitstreams with respective orthogonal or substantially orthogonal spectrum spreading signals to produce a plurality of modulating signals;

second means for phase modulating respective instances of a carrier with said modulating signals to produce a plurality to modulated carrier instances; and summing means for summing the modulated carrier instances.

52. The apparatus of claim 51, wherein the spreading signals comprise a common finite spreading sequence.

53. An apparatus, comprising:

receiving means for receiving a signal produced by a method comprising providing digital data to be transmitted to a remote station as a plurality of parallel bitstreams, phase modulating said bitstreams with respective orthogonal or substantially orthogonal spectrum spreading signals to produce a plurality of modulating signals, phase modulating respective instances of a carrier with said modulating signals to produce a plurality to modulated carrier instances, and summing the modulated carrier instances and transmitting the result of said summation, the receiver means comprising radio frequency processing means for producing a baseband signal, comprising components corresponding to the modulating signals, from a received radio frequency signal; and processing means for processing the baseband signal by processes configured to extract the data from each of the modulating signals.

54. The apparatus of claim 53, wherein the spreading signals comprise a common finite spreading sequence.

55. A network, comprising:

a plurality of mobile phones; and a base station in communicative relation to the plurality of mobile phones, the base station including a receiver comprising:

radio frequency processing means for producing a baseband signals, comprising components corresponding to the modulating signals, from a received radio frequency signal, and processing means for processing the baseband signal by processes configured to extract the data from each of the modulating signals; and each mobile phone including a transmitter comprising:

digital data source means for providing digital data to be transmitted to a remote station as a plurality of parallel bitstreams;

first means for phase modulating said bitstreams with respective orthogonal or substantially orthogonal spectrum spreading signals to produce a plurality of modulating signals;

second means for phase modulating respective instances of a carrier with said modulating signals to produce a plurality to modulated carrier instances; and summing means for summing the modulated carrier instances; wherein the mobile phones employ the same carrier frequency and spreading signals for communication with the base station, each mobile phone applying the spreading signals in a time offset manner relative to the use of the spreading signals by each of the other mobile phones.

56. The network of claim 55, wherein the spreading signals comprise a common finite spreading sequence.

* * * * *